(12) United States Patent
Wang

(10) Patent No.: US 11,705,795 B2
(45) Date of Patent: Jul. 18, 2023

(54) MAGNETIC LEVITATION MOTOR

(71) Applicant: Jin-Lang Wang, Changhua (TW)

(72) Inventor: Jin-Lang Wang, Changhua (TW)

( * ) Notice: Subject to any disclaimer, the term of this patent is extended or adjusted under 35 U.S.C. 154(b) by 128 days.

(21) Appl. No.: 17/463,342

(22) Filed: Aug. 31, 2021

(65) Prior Publication Data

US 2023/0063414 A1    Mar. 2, 2023

(51) Int. Cl.
*H02K 16/00* (2006.01)
*H02K 1/28* (2006.01)
*H02K 1/14* (2006.01)
*H02K 7/08* (2006.01)

(52) U.S. Cl.
CPC ............ *H02K 16/00* (2013.01); *H02K 1/14* (2013.01); *H02K 1/28* (2013.01); *H02K 7/083* (2013.01)

(58) Field of Classification Search
CPC ............ H02K 16/00; H02K 1/14; H02K 1/28; H02K 7/083
USPC ............................................................. 310/90
See application file for complete search history.

(56) References Cited

FOREIGN PATENT DOCUMENTS

| CN | 101710767 | * | 5/2010 | ............ H02K 16/00 |
| CN | 101710767 | * | 2/2012 | ............ H02K 16/00 |
| CN | 111742473 | * | 10/2020 | ............ H02K 16/04 |
| WO | WO-2019138308 A1 | * | 7/2019 | ............ H02K 1/182 |

* cited by examiner

*Primary Examiner* — Terrance L Kenerly

(57) ABSTRACT

A magnetic levitation motor has a housing, a plurality of stators and a plurality of rotors. The housing has a shaft hole there through, the shaft hole accepting a bearing, the bearing rotatably engages with a rotating shaft that extends from two ends of the housing, and a plurality of fastening portions are disposed on the rotating shaft. A main body section is disposed between at least two of the fastening portions, and the housing having a plurality of dividers to define a plurality of containing spaces. The stator has a fixing disk wrapped with a coil and having a through aperture the fixing disk, and the fixing disk has a plurality of first magnets circularly and radially arranged. The rotor has a moving disk with a toothed hole at a center the moving disk, and the moving disk having a plurality of second magnets arranged circularly and radially.

5 Claims, 5 Drawing Sheets

MAGNETIC LEVITATION MOTOR

BACKGROUND OF INVENTION

Field of Invention

The present invention relates to a magnetic levitation motor, and more particularly to a high efficient magnetic levitation motor.

Description of the Related Art

Currently, most of the motors include the stators, the rotors and the rotating shaft. The stator has several silicon steel sheets wrapped with coils, and the rotor is connected to the rotating shaft and includes multiple magnets, so that when the motor generates electricity or power output, the rotating shaft drives the rotor to rotate.

However, the above conventional structure still has the following problems in practical applications: the rotor and the rotating shaft are single-point connection, which causes excessive torsion stresses, so that the motors are not suitable for power output or transmission of large torque. Also, during the energy conversion, two motors convert kinetic energy into electrical energy or electrical energy into mechanical energy due to frictional resistance during operation, which causes excessive energy loss and low effective performance.

Therefore, it is desirable to provide a magnetic levitation motor to mitigate and/or obviate the aforementioned problems.

SUMMARY OF THE INVENTION

An objective of present invention is to provide a magnetic levitation motor.

To achieve these and other objects of the present invention, A magnetic levitation motor has a housing, a plurality of stators and a plurality of rotors. The housing has a shaft hole there through, the shaft hole accepting a bearing, the bearing rotatably engages with a rotating shaft that extends from two ends of the housing, and a plurality of fastening portions are disposed on the rotating shaft. A main body section is disposed between at least two of the fastening portions, and the housing having a plurality of dividers to define a plurality of containing spaces. The stator has a fixing disk wrapped with a coil and having a through aperture the fixing disk, and the fixing disk has a plurality of first magnets circularly and radially arranged. The rotor has a moving disk with a toothed hole at a center the moving disk, and the moving disk having a plurality of second magnets arranged circularly and radially.

Other objects, advantages, and novel features of invention will become more apparent from the following detailed description when taken in conjunction with the accompanying drawings.

DETAILED DESCRIPTION OF THE PREFERRED EMBODIMENT

Figure 1:
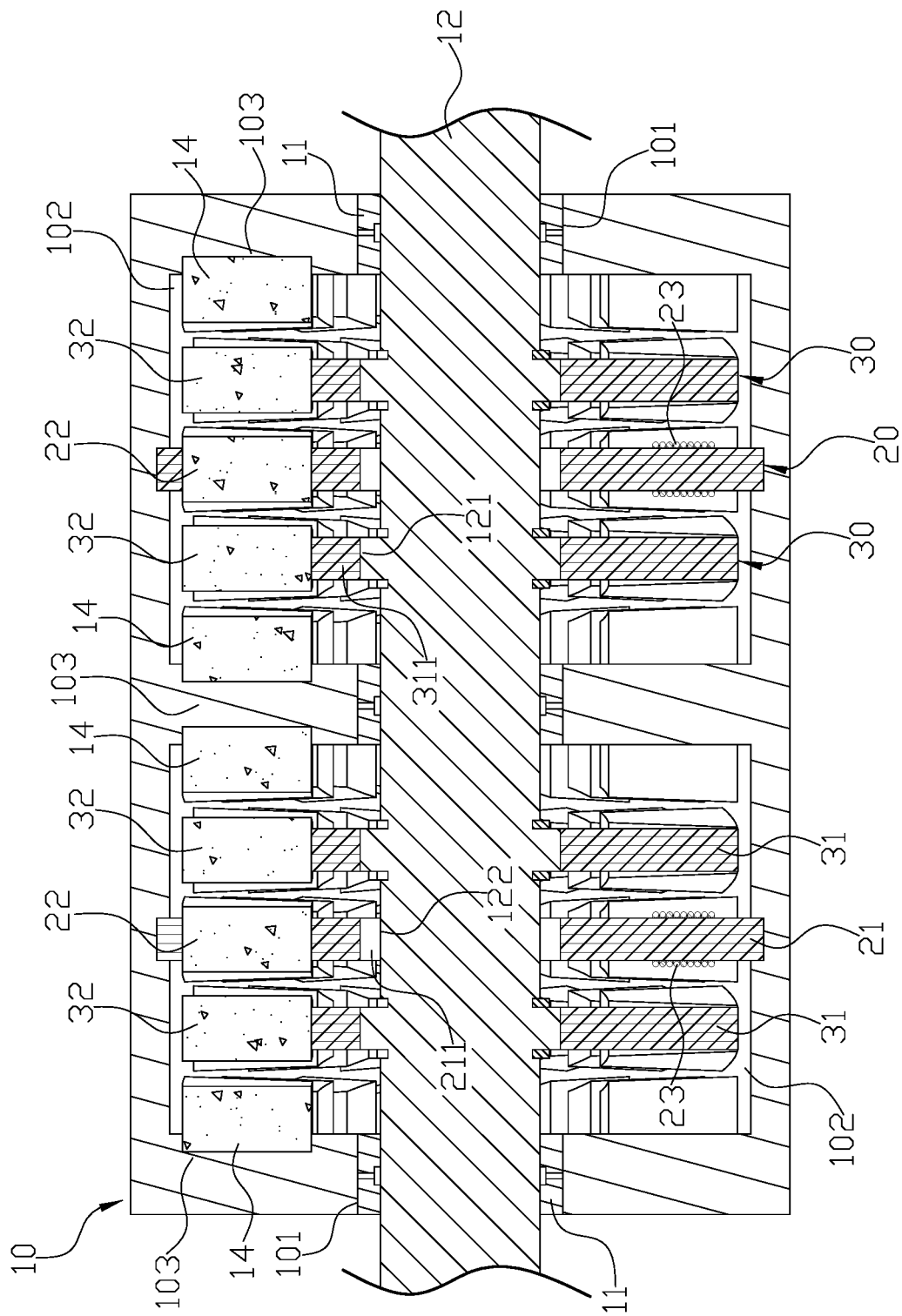
FIG. 1 is an overall structural drawing of according to a preferred embodiment of the present invention.
Figure 2:
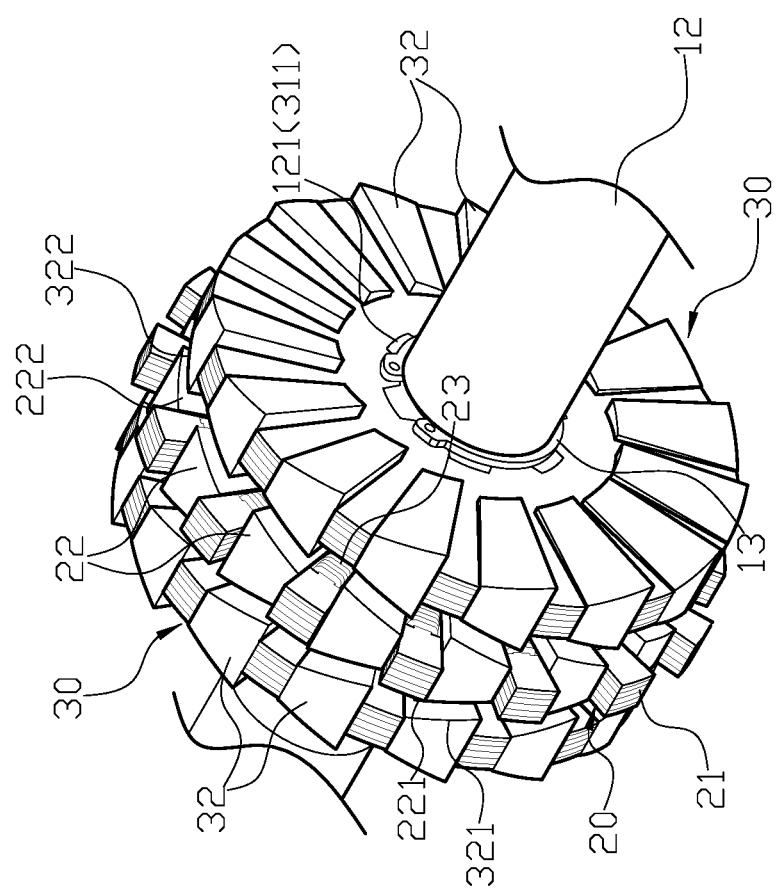
FIG. 2 is a perspective view of the stator and the rotor combined on the rotating shaft according to the preferred embodiment of the present invention.
Figure 3:
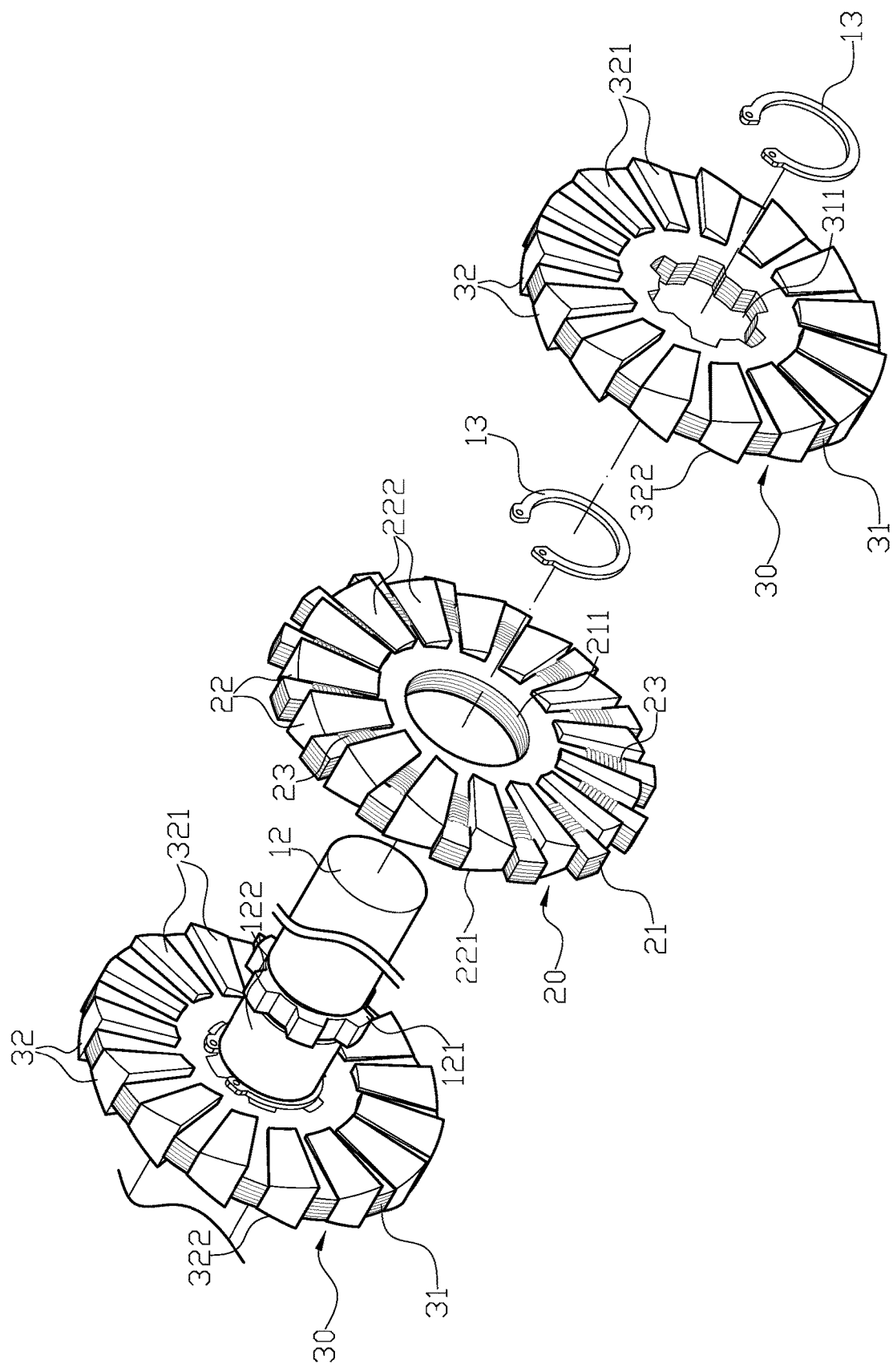
FIG. 3 is a three-dimensional exploded view according to the preferred embodiment of the present invention.

First, please refer to FIGS. 1-4. A magnetic levitation motor comprises a housing 10, a plurality of stators 20 and a plurality of rotors 30. The housing 10 has a shaft hole 101 there through, the shaft hole 101 accepts the bearing 1, and the bearing 11 rotatably engages with the rotating shaft 12 that extends from two ends of the housing 10. A plurality of fastening portions 121 are disposed on the rotating shaft 12, each fastening portion 121 is gear-shaped and has a plurality of engaging teeth protruding from the rotating shaft 12. A main body section 122 is disposed between at least two of the fastening portions 121 of the rotating shaft 12, and the housing 10 a plurality of dividers 103 to define a plurality of containing spaces. The stator 20 has a fixing disk 21 with a coil 23 and having a through aperture 211 larger than each of the fastening portions 121, such that the fastening portions 121 are able to pass through the through aperture 211 of the fixing disk 21 and sleeve the main body section 122 of onto the rotating shaft 12 and then are securable in the containing spaces 102 of the housing 10. The fixing disk 21 has a plurality of first magnets 22 circularly and radially arranged, each of the first magnets 22 has a first magnetic surface 221 with an identical magnetic pole on one side and a second magnetic surface 222 with an opposite identical magnetic pole on an opposite side respectively protruding from two opposite sides of the fixing disk 21. In other words, all of the first magnetic surfaces on one side of the fixing disk 21 are all N pole or S pole, and all of the second magnetic surfaces 222 on the other side of the fixing disk 21 are all S pole or N pole. Each first magnet 22 is a trapezoidal frustum, and each of the first magnetic surfaces 221 and the second magnetic surfaces 222 has an inclination angle. The rotor 30 has a moving disk 31 with a toothed hole 311 at a center engaging with the fastening portion 121 of the rotating shaft 12, such that the rotor 30 engages with the rotating shaft 12 at two sides of the stator 20 and apart from the stator 20. Furthermore, the moving disk 31 has a plurality of second magnets 32 arranged circularly and radially, each of the second magnet 32 has a third magnetic surface 321 with an identical magnetic pole on one side and a fourth magnetic surface 322 with another identical magnetic pole on the opposite side respectively protruding from two opposite sides of the moving disk 31. In other words, all of the third magnetic surfaces 321 on one side of the moving disk 31 are all N pole or S pole, and all of the fourth magnetic surfaces 322 on the other side of the moving disk 31 are all S pole or N pole. Each second magnet 32 is being a trapezoidal frustum and disposed in a reversed orientation with respect to the first magnet 22, and each of the third magnetic surfaces 321 and the fourth magnetic surfaces 322 has an inclination angle such that the third magnetic surfaces 321 and the first magnetic surfaces 221 of the first magnets 22 with the identical magnetic pols are adjacent, and the fourth magnetic surfaces 322 and the second magnetic surfaces 222 of the first magnets 22 are adjacent, as shown in FIG. 5.

Moreover, the fastening portions 121 of the rotating shaft 12 engage with the toothed hole 311 of the rotor 30, and a C-type retaining ring 13 is employed to be secured with the rotor 30.

Figure 4:
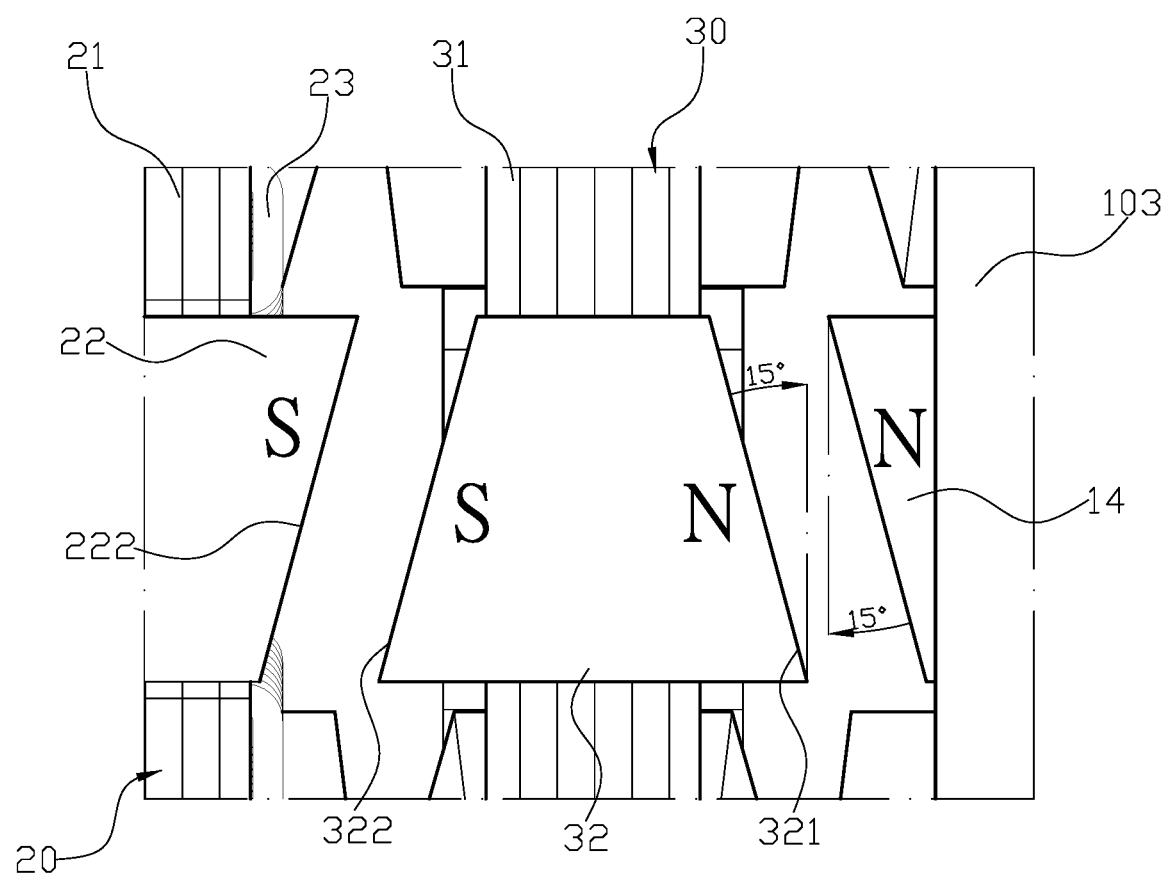
FIG. 4 is state drawing showing each magnet according to the preferred embodiment of the present invention.

In addition, all of the first magnetic surfaces 221, the second magnetic surface 222, the third magnetic surface 321 and the fourth magnetic surface 322 have a 15° inclination angle as shown in FIG. 4.

Figure 5:
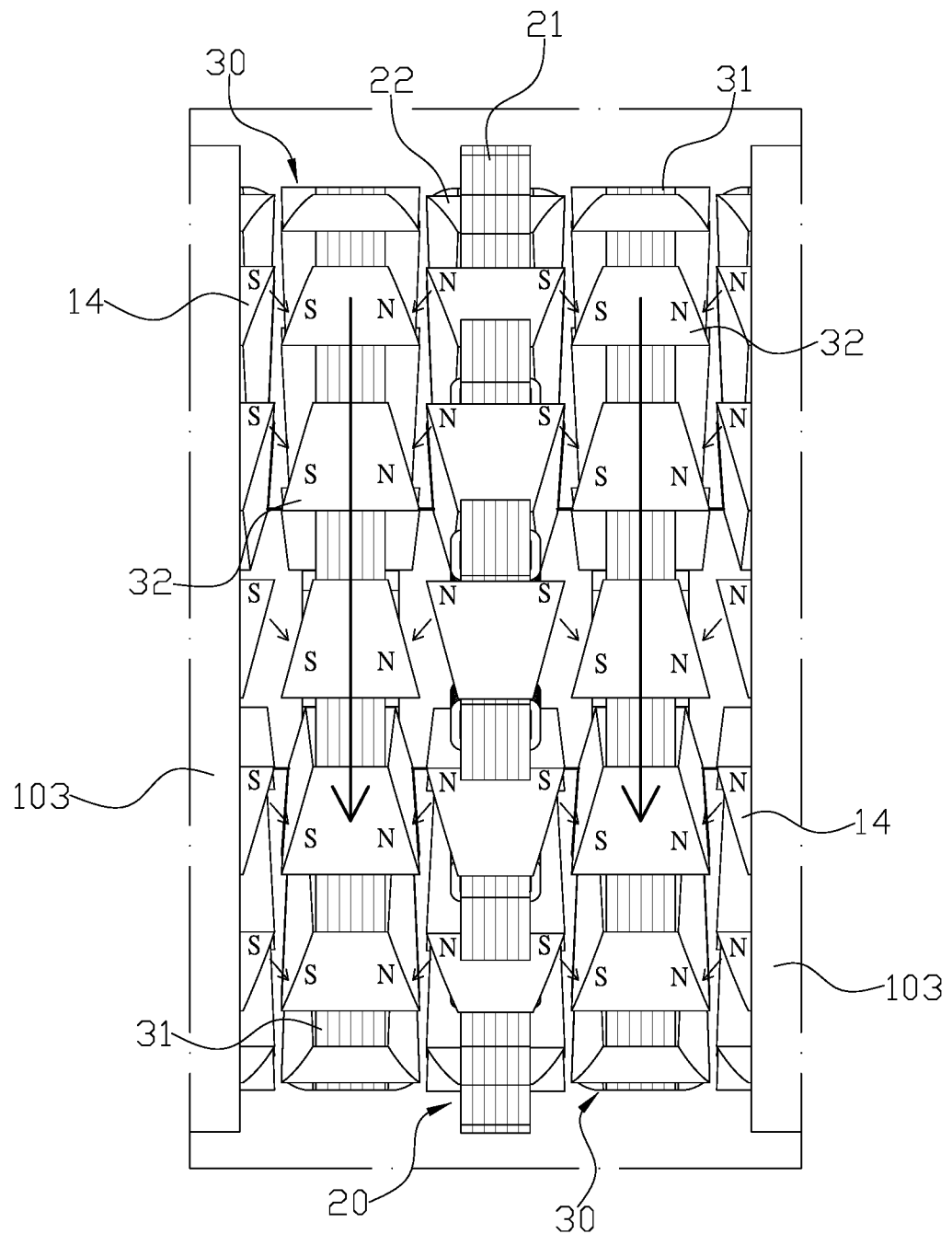
FIG. 5 is a state drawing of the rotor being driven to rotate according to the preferred embodiment of the present invention.

Also, the divider 103 further has a plurality of third magnets 14 equal to the number of the first magnets 22, such that the first magnets 22 and the third magnets 14 sandwich the second magnets 32, as shown in FIG. 1, FIG. 4 and FIG. 5.

Furthermore, a magnetic surface of each third magnet 14 adjacent to the second magnets 32 has a 15° inclination angle.

Additionally, the divider 103 further has a shaft hole 101 capable of being sleeved onto the bearing 11.

Also, the fixing disk 21 is composed of multiple silicon steel sheets or copper sheets stacked on each other.

Likewise, the moving disk 31 is composed of multiple silicon steel sheets or copper sheets stacked on each other.

The above-mentioned magnetic levitation motor has following advantages: the rotor 30 and the rotating shaft 12 use the engagement of the toothed hole 311 and the fastening portion 121 to make sure the rotor 30 is evenly stressed to prevent the torsional stress from being concentrated on a single connection during operation, so that the motor can be more suitable for power output or transmission of large torsion; also, the third magnetic surfaces 321 and the first magnetic surfaces 221 with the same magnetic pole are arranged adjacent to the fourth magnetic surface 322 and the second magnetic surface 222 with the same magnetic pole to achieve a magnetic levitation effect by the same polarity that repels each other, which can effectively reduce the friction loss of the motor during operation; besides, with the inclined surface, the magnetic range generating mutual repulsion can be extended greatly, so that the operation of the motor can be more efficient.

Although the present invention has been explained in relation to its preferred embodiment, it is to be understood that many other possible modifications and variations can be made without departing from the spirit and scope of invention as hereinafter claimed.

What is claimed is:

1. A magnetic levitation motor comprising: a housing, a plurality of stators and a plurality of rotors; wherein:

the housing has a shaft hole there through, the shaft hole accepting a bearing, the bearing rotatably engaging a rotating shaft that extends from two ends of the housing, a plurality of fastening portions disposed on the rotating shaft, each fastening portion being gear-shaped and having a plurality of engaging teeth protruding from the rotating shaft, a main body section disposed between at least two of the fastening portions, the housing having a plurality of dividers to define a plurality of containing spaces;

the stator has a fixing disk wrapped with a coil and having a through aperture larger than each of the fastening portions, such that the fastening portions are able to pass through the through aperture of the fixing disk and sleeve onto the main body section of the rotating shaft and then are securable in the containing spaces of the housing; the fixing disk has a plurality of first magnets circularly and radially arranged, each of the first magnets has a first magnetic surface with an identical magnetic pole on one side and a second magnetic surface with an opposite identical magnetic pole on an opposite side respectively protruding from two opposite sides of the fixing disk, each first magnet is a trapezoidal frustum, and each of the first magnetic surfaces and the second magnetic surfaces has an inclination angle; and the rotor has a moving disk with a toothed hole at a center engaging with the fastening portions of the rotating shaft, such that the rotor engages with the rotating shaft at two sides of the stator and apart from the stator, the moving disk having a plurality of second magnets arranged circularly and radially, each of the second magnets having a third magnetic surface with an identical magnetic pole on one side and a fourth magnetic surface with another identical magnetic pole on the opposite side respectively protruding from two opposite sides of the moving disk, each second magnet being a trapezoidal frustum and disposed in a reversed orientation with respect to the first magnet, and each of the third magnetic surfaces and the fourth magnetic surfaces has an inclination angle such that the third magnetic surfaces and the first magnetic surfaces of the first magnets with the identical magnetic poles are adjacent, and the fourth magnetic surfaces and the second magnetic surfaces of the first magnets are adjacent.

2. The magnetic levitation motor as claimed in claim 1, wherein the fastening portions of the rotating shaft engage with the toothed hole of the rotor, and a C-type retaining ring is employed to be secured with the rotor.

3. The magnetic levitation motor as claimed in claim 1, wherein all of the first magnetic surfaces, the second magnetic surfaces, the third magnetic surfaces, and the fourth magnetic surfaces have a 15° inclination angle.

4. The magnetic levitation motor as claimed in claim 1, wherein the divider further has a plurality of third magnets equal to the number of the first magnets, such that the first magnets and the third magnets sandwich the second magnets.

5. The magnetic levitation motor as claimed in claim 4, wherein a magnetic surface of each third magnet adjacent to the second magnets has a 15° inclination angle.

\* \* \* \* \*